US006324629B1

(12) United States Patent
Kulkarni et al.

(10) Patent No.: US 6,324,629 B1
(45) Date of Patent: Nov. 27, 2001

(54) METHOD FOR DETERMINING AN OPTIMIZED DATA ORGANIZATION

(75) Inventors: Chidamber Kulkarni, Leuven; Koen Danckaert, Asse; Francky Catthoor, Temse; Hugo De Man, Leuven, all of (BE)

(73) Assignees: CoWare N.V., Frontier Design BYBA; Interuniversitaire Microelektronics Centrum (IMEC), both of (BE)

( * ) Notice: Subject to any disclaimer, the term of this patent is extended or adjusted under 35 U.S.C. 154(b) by 0 days.

(21) Appl. No.: 09/360,041

(22) Filed: Jul. 23, 1999

Related U.S. Application Data

(60) Provisional application No. 60/094,132, filed on Jul. 24, 1998.

(51) Int. Cl.$^7$ ........................................... G06F 12/02
(52) U.S. Cl. ................................. 711/165; 711/118
(58) Field of Search ............................ 711/5, 150, 157, 711/173, 165; 365/230.03

(56) References Cited

U.S. PATENT DOCUMENTS

| | | | |
|---|---|---|---|
| 5,341,489 | * 8/1994 | Heiberger et al. | 365/185.11 |
| 5,530,958 | * 6/1996 | Agarwal et al. | 711/3 |
| 5,943,691 | * 8/1999 | Wallace et al. | 711/172 |
| 6,041,393 | * 3/2000 | Hsu | 711/157 |

OTHER PUBLICATIONS

C. Ancourt, D. Barthou, C. Guettier, F. Irigoin, B. Jeannet, J. Jourdan, J. Mattioli, "Automatic Data Mapping Of Signal Processing Applications", Proc. Intnl. Conf. on Applic.–Spec. Array Processors, Zurich, Switzerland, pp. 350–362 Jul. 1997.

M. Cierniak, W. Li, "Unifying Data And Control Transformation For Distributed Shared–Memory Machines", Proc. of the SIGPLAN'95 Conf. on Programming Language Design and Implementation, La Jolla, pp. 205–217, Feb. 1995.

J. Z. Fang, M. Lu, "An Iteration Partition Approach For Cache Or Local Memory Thrashing On Parallel Processing", IEEE Trans. On Computers, vol. C–42, No. 5, pp. 529–546, May 1993.

J. Anderson, S. Amarasinghe, M. Lam, "Data And Computation Transformations For Multiprocessors", in $5^{th}$ ACM SIGPLAN Symposium on Principles and Practice of Parallel Programming, pp. 39–50, Aug. 1995.

M. Lam, E. Rothberg and M. Wolf, "The Cache Performance And Optimizations Of Blocked Algorithms", In Proc. ASPLOS–IV, pp. 63–74, Santa Clara, CA, 1991.

P. R. Panda, N. D. Dutt and A. Nicolau, "Memory Data Organization For Improved Cache Performance In Embedded Processor Applications", In Proc. ISSS–96, pp. 90–95, La Jolla, CA, Nov. 1996.

K. Pettis and R. C. Hansen, "Profile Guided Code Positioning", In ACM SIGPLAN'90 Conference on Programming Language and Design Implementation, pp. 16–27, Jun. 1990.

\* cited by examiner

Primary Examiner—Hiep T. Nguyen
(74) Attorney, Agent, or Firm—Knobbe, Martens, Olson & Bear, LLP

(57) ABSTRACT

A method for determining an optimized data organization in at least one first memory of an essentially digital system comprising at least the first memory and a second memory, acting as cache for the first memory, the optimized data organization being characteristic for an application, to be executed by the digital system, is presented.

21 Claims, 19 Drawing Sheets

```
For(x=0:x<N/Nb:x++)                \\ N = 1024 :  Nb = 16
  For(y=0:y<M/Nb:y++)              \\ M = 1536
  {
    xm = N/4-1:
    ym = M/4-1:
    min = 4080:
    For(v4x1=0:v4x1<9:v4x1++)
      For(v4y1=0:v4y1<9:v4y1++)
      {
        {  dist = 0:
           For(x4=0:x4<4:x4++)
             For(y4=0:y4<4:y4++)
             {
               If (x4<0 II x4>xm II y4<0 II y4>ym) p1 = 0 :
               else  p1 = current[4*x+x4] [4*y+y4] :
               x1 = F(x.y): y1 = F(x.y):
               If (x1<0 II x1>xm II y1<0 II y1>ym) p2 = 0 :
               else  p2 = previous [4*x+v4x1-4+x4] [4*y+v4y1-4+y4] ;

dist += abs(p1 - p2) :
             }
           If ( dist<min )
           {
             min = dist :
             v4x[x] [y] = v4x1 - 4 :
             v4y[x] [y] = v4y1 - 4 :
           }
        }
      }
  }
```

*FIG. 3A*

```
For(x=0:x<N/Nb:x++)           \\ N = 1024 :  Nb = 16
  For(y=0:y<M/Nb:y++)         \\ M = 1536
  {  xm = N/4-1:
     ym = M/4-1:
     min = 4080:
     For(x4=0:x4<4:x4++)
       For(y4=0:y4<4:y4++) {
          kk1 = ((4*x+x4)*M/Nb)+4*y+y4:
          Temp[4*x4+y4] = current [(kk1 % 96) + (kk1/96)*C+16]: }
     For(v4x1=0:v4x1<9:v4x1++)
       For(v4y1=0:v4y1<9:v4y1++)
       {  dist = 0:
          For(x4=0:x4<4:x4++)
            For(y4=0:y4<4:y4++)
            {  If (x4<0 II x4>xm II y4<0 II y4>ym) p1 = 0 :
               else  p1 = Temp[4*x4+y4] :
               x1 = F(x.y): y1 = F(x.y):
               If (x1<0 II x1>xm II y1<0 II y1>ym) p2 = 0 :
               else  {kk2 = ((4*x+v4x1-4+x4)*M/Nb)+4*y+v4y1-4+y4:
                      p2 = previous [(kk2 % 112) + (kk2/112)*C+112 : }
               dist += abs(p1 - p2) :
            }
          If ( dist<min )
          {
             min = dist :
             kk3 = ( x*M/Nb)+y):
             v4x[(kk3 % 16) + (kk3/16)*C+224] = v4x1 - 4 :
             v4y[(kk3 % 16) + (kk3/16)*C+240] = v4y1 - 4 :
          }
       }
  }
```

*FIG. 3B*

METHOD FOR DETERMINING AN OPTIMIZED DATA ORGANIZATION

RELATED APPLICATION

This application claims priority to Provisional Application No. 60/094,132, filed on Jul. 24, 1998.

FIELD OF THE INVENTION

The invention relates to methods for determining a data organization in an essentially digital system with caches.

BACKGROUND OF THE INVENTION

Many software compilers try to come up with the best array layout in memory for optimal cache performance [C. Ancourt, D. Barthou, C. Guettier, F. Irigoin, B. Jeannet, J. Jourdan, J. Mattioli, Automatic data mapping of signal processing applications, Proc. ntnl. Conf. on Applic.-Spec. Array Processors}, Zurich, Switzerland, pp.350–362, July 1997. ], [M. Cierniak, W. Li, Unifying data and control transformations for distributed shared-memory machines, Proc. of the SIGPLAN'95 Conf. on Programming Language Design and Implementation, La Jolla, pp.205–217, February 1995. ], [J. Z. Fang, M. Lu, An iteration partition approach for cache or local memory thrashing on parallel processing, IEEE Trans. On Computers, Vol.C-42, No.5, pp.529–546, May 1993. ] for approach based on compile-time analysis) but they do not try to directly reduce the storage requirements as memory is allocated based on the available variable declarations. Said compilers choose for each array as a whole a column- or row-oriented storage order and potentially some offset, for optimizing the cache performance. Moreover, the number of transfers to large memories or the amount of cache misses is not fully minimized this way. Consequently, there is a big loss in power consumption and overhead cycles (due to off-chip access).

Most of the work related to efficient utilization of caches has been directed towards optimization of the throughput by means of (local) loop nest transformations to improve locality [J. Anderson, S. Amarasinghe, M. Lam, Data and computation transformations for multiprocessors, in 5th ACM SIGPLAN Symposium on Principles and Practice of Parallel Programming, pp.39–50, August 1995. ],[N. Manjikian and T. Abdelrahman, Array data layout for reduction of cache conflicts, In Proc. of 8th Int'l conference on parallel and distributed computing systems, September, 1995. ] The most commonly known loop transformation for improving cache usage is loop locking [M. Lam, E. Rothberg and M. Wolf, The cache performance and optimizations of blocked algorithms, In Proc. ASPLOS-IV, pp.63–74, Santa Clara, Calif., 1991.]. Such approaches are focussed on changing the execution order of the application for cache usage optimization.

Some work [P. R. Panda, N. D. Dutt and A. Nicolau, Memory data organization for improved cache performance in embedded processor applications], In Proc. ISSS-96, pp.90–95, La Jolla, Calif., November 1996.] has been reported on the data organization for improved cache performance in embedded processors but they do not take into account a power oriented model. Instead they try to reduce cache conflicts in order to increase the throughput. Such approach is based on merging or clustering arrays found in the application in order to optimize cache performance. K. Pettis and R. C. Hansen, Profile guided code positioning, In ACM SIGPLAN'90 Conference on Programming Language and Design Implementation, pp. 16–27, June 1990. propose basic-block layout heuristics (they pack frequently used looping sequences) as well as procedure layout (they lay together procedures calling each other to minimize cache interference risks). But they still do explore this type of strategy for every individual data. Besides [D. C. Burger, J. R. Goodman and A. Kagi, The declining effectiveness of dynamic caching for general purpose mutliprocessor, Technical Report, University of Wisconsin, Madison, 1261, 1995] and [D. N. Truong, F. Bodin and A. Seznec, Accurate data distribution into blocks may boost cache performance, Technical Report, RISA, Rennes (France), 1996. ], very little has been done to measure the impact of data organization (or layout) on the cache performance. Moreover, said approaches deal with dynamic caching and do not try to influence data organization statically. Hence, the actual cycle time (or the number of iterations) taken to obtain a good data layout is quite large.

One can conclude that in the current state of the art compile-time system-level optimization strategies focussed on cache utilization, aiming at low power, based on static data organization of the main memory and fully exploiting the knowledge of cache parameters and program characteristics, is not found.

AIM OF THE INVENTION

An aim of the invention is to provide a method for determining an optimized data organization in an essentially digital system with caches, such that an optimal cache performance is obtained.

SUMMARY OF THE INVENTION

In a first aspect of the invention a method and a design system for determining an optimized data organization in at least one first memory of an essentially digital system is proposed. Said digital system comprises at least of said first memory and a second memory. Said second memory acts as cache for said first memory. Said optimized data organization is characteristic for an application, to be executed by said digital system. In said method and said design system first a representation of said application is loaded. Said representation comprises at least data access instructions on arrays. Said arrays are partitioned in a plurality (one or more) subarrays. Said subarrays are distributed over said first memory such that an optimal cache performance of said second memory is obtained. Said distribution defines said optimized data organization. With optimal cache performance is meant that the least number of conflict misses is obtained while executing said application on said digital system. Each of said subarrays is located in said first memory at locations with subsequent (contiguous) addresses. Said second memory or cache is characterized by the amount of lines and the size of said lines. Said lines are grouped in sets. Said grouping is characterized by the amount of lines per set, and defines the associativitiy of said cache memory. The product of said amount of lines and the size of said lines defines the cache size. As typically another data organization different from the initial data organization, defined by said representation, is obtained, it can be said that the method modifies said representation, and more in particular the storage order of said arrays in said representation is changed. This should not be confused with modifying the execution order of the data access instructions.

In an embodiment of the invention a condition on said subarray distribution is presented. As the transfer of data from said first to said second memory is typically determined by a modulo operation on the base addresses of said data in the first memory, an optimal cache performance can be obtained by organizing said subarrays in said first memory such that each of the subarrays within an address range being equal to the cache size originate from different arrays.

In some embodiments of the invention methods for determining the size of each subarray is proposed. Said size of each subarray can be proportional with the size of the related array. The proportionality factor is defined by said cache size divided by the sum of the sizes of said arrays. Again as the transfer of data from said first to said second memory is typically determined by a modulo operation on the base addresses of said data in the first memory, the cache performance is optimized by choosing the size of each of said subarrays to be a multiple of said line sizes. The propotionality condition and the multiplicity condition can be merged by stating that the size of each of said subarrays is the nearest rounded number of the size of the related array multiplied with the cache size divided by the sum of the sizes of said arrays. Said rounded number is a multiple of said line sizes. The merging of proportionality and multiplicity results in a possible initial set of sizes of said subarrays. However, further optimization of said sizes can be obtained by determining said sizes via optimization of an evaluation criterion which may be related to the conflict misses. Said initial set of sizes can be used as an initialization of said optimization step. Said evaluation criterion preferably comprises at least the cache miss count of said arrays.

In an embodiment of the invention a selection on the arrays, found in the application representation, is performed. The proposed partitioning and distributing is performed only for the selected arrays. The remaining arrays and potentially other variables are then pasted in potentially free locations in said first memory. A potential selection is based on the ratio of the size of said array over the cache size.

In a further embodiment of the invention a post-processing step is applied on the application representation. Indeed, as the method results in a change or modification of the storage order of the arrays, the addressing can become more complicated. Therefore, the use of an address optimization step on said representation can be advantageous.

In a further embodiment of the invention a pre-processing step is applied on the application representation. Indeed, various representation transformations such as loop transformations and loop blocking can also enhance the cache performance. As the pre-processing steps are orthogonal to the methodology in accordance with the present invention they can be combined easily.

In a further embodiment of the invention it is recognized that in said application representation said data access instruction are grouped in blocks. For instance, each loop nest defines a block of said instructions. As data access on arrays in one loop nest results in accessing arrays with overlapping life times, it can be useful to consider only part of said array instead of the actual size of an array, more in particular that part being accessed while executing said loop. Therefore, the concept of an effective size is defined for arrays. An effective size of an array is the size of that part of the array being accessed in the particular loop nest or block under consideration. It can be said that said effective size is related to said blocks. When a plurality of blocks are found in said application representation, a plurality of effective sizes are found for an array being accessed in said plurality of blocks. As the method and design system requires the size of an array, a size being determined from the array's effective sizes can be used instead of the actual size of said array. Such a determination step can be for instance taking the maximal effective size as the size of the array. This size is then used for determining the size of each subarray via the proportionality principle, saying that said subarrays are proportional with the size of the related array, and further exploiting the multiplicity condition, stating that said sizes should be a multiple of the line sizes.

BRIEF DESCRIPTION OF THE DRAWINGS

FIG. 3 shows as an example data organizations for a real-time motion estimation application. The arrays considered are CURRENT, PREVIOUS, TEMP, V4XV4Y. In the left data organization each array is placed, distributed at base addresses in the memory which are subsequent to each other. The middle data organization shows a reordering of said array locations in said memory, in order to improve the cache performance. The right data organization is according to the invented method and comprises of a plurality of subarrays, each being related to or partitions from the original arrays CURRENT, PREVIOUS, TEMP, V4XV4Y. Said subarrays are distributed such that optimal cache performance is obtained.

DETAILED DESCRIPTION OF THE INVENTION

In a first aspect of the invention a method and a design system for determining an optimized data organization in at least one first memory of an essentially digital system is proposed. Said digital system comprises at least of said first memory and a second memory. Said second memory acts as cache for said first memory.

Figure 1:
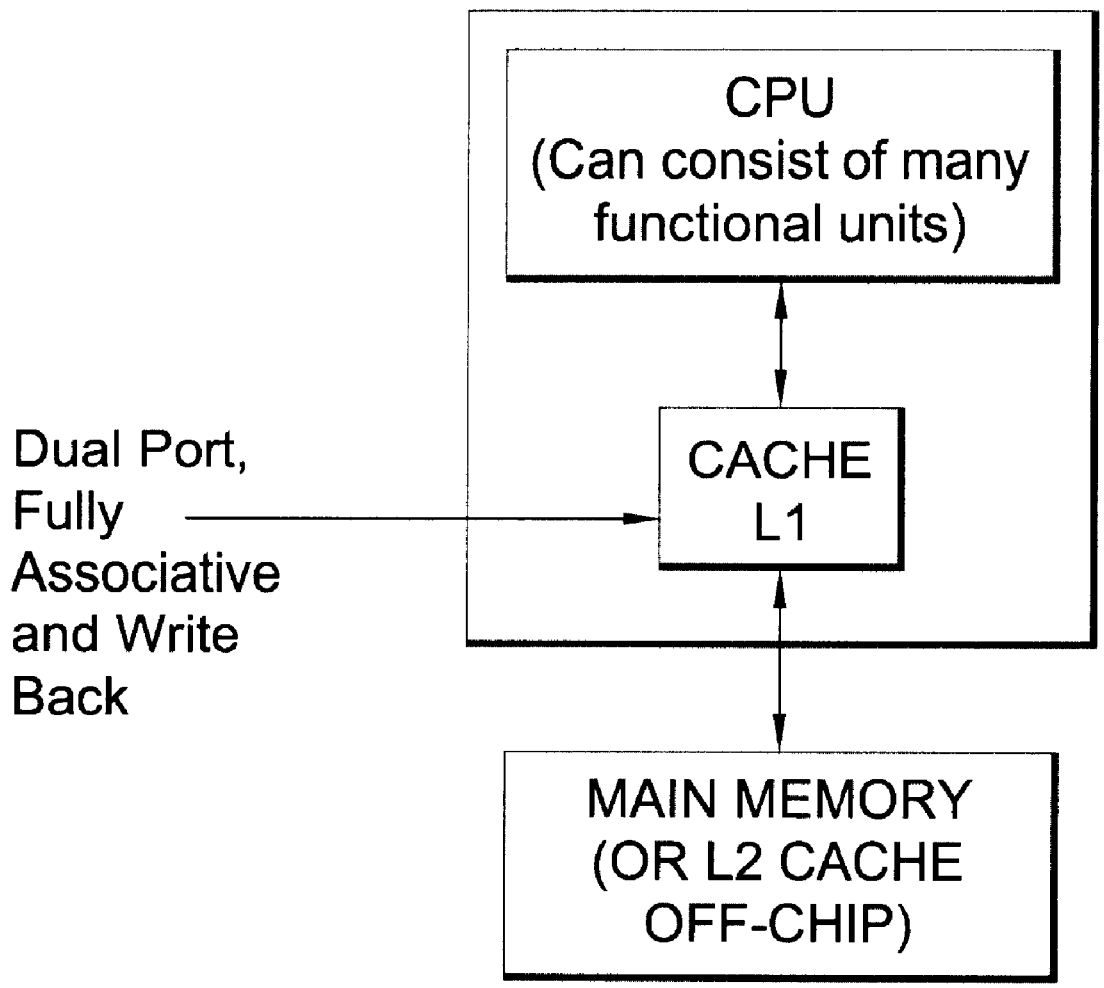
FIG. 1 shows an essentially digital system, comprising of a first (off-chip) memory, a second (on-chip) memory, acting as cache for said first memory, and a processor unit. The method determines a data organization in said first memory.

An example of the architecture, targeted in the invention, is shown in FIG. 1. A processor (CPU), a cache memory (L1) and a main memory is shown. Said cache memory is said second memory as denoted in the method and design system in accordance with the present invention. Said main memory is said first memory as denoted in the method and design system.

However the invented method and design system can equally be applied to an essentially digital system with a plurality of memories, for instance a system with a memory hierarchy or a distributed memory. As long as a functional relationship, more in particular a set of memories is operating as a cache for another set of memories, can be defined, the method can be exploited. For each such functional relationship defined the method and design system can be exploited.

More formally the classical definition of cache is any storage managed to take advantage of locality of data accesses. In general cache is the name given to the first level of a memory hierarchy when a replacement and updating policy has been defined between this level and the next level of the hierarchy. If there is only one local memory then it is called a cache. If there exist more than one memory between the main memory and the foreground memory in the processor(s) then the terms L1 (level one) and L2 (level two) cache and so on can be used. Note that L1 is the nearest memory to the processing unit, hence larger number in hierarchy signifies longer latency in accessing data from that particular memory. Also terms like primary cache for on-chip memory and secondary cache for off-chip memory is often observed. This is due to the fact that many times there is an memory hierarchy off-chip also. This is mostly observed for workstations. The rest of the detailed description is restricted to one level of caching but the proposed method can also be recursively applied to n levels starting from L1.

Figure 2:
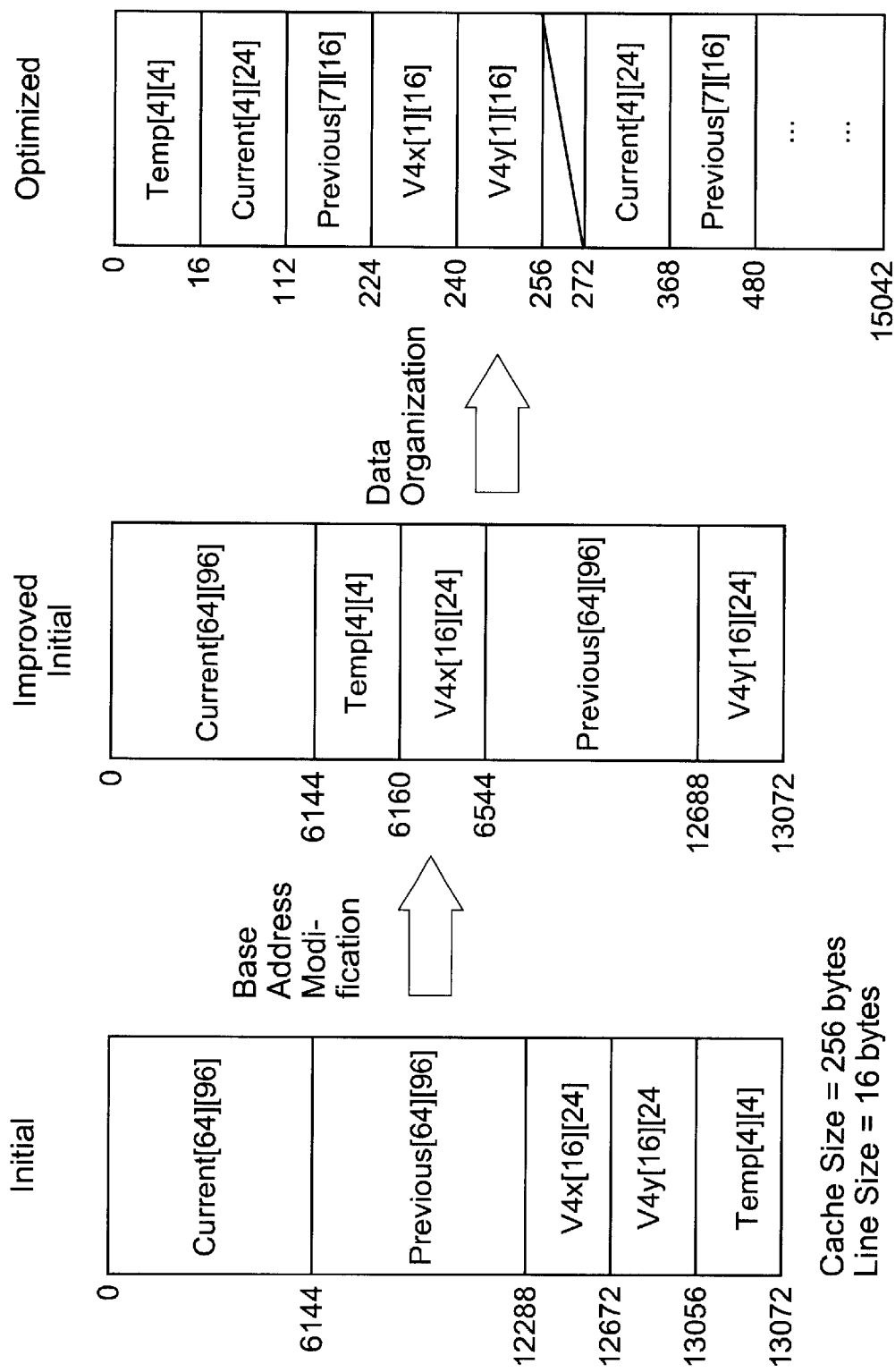
FIG. 2 shows as an example a representation of a real-time motion estimation application, with data access instructions on the arrays CURRENT, PREVIOUS, TEMP, V4X, V4Y. The top representation is the representation, loaded in the invented method. The lower code, shows the modified representation, being a result of the invented method. It is clear that the execution order is not modified in said modified representation but the storage order is changed. This can easily be observed in the addressing expressions of the arrays considered. As these became a bit more complex, the further exploiting of a further address optimization step can be useful.

The optimized data organization in said first memory is characteristic for an application, to be executed by said digital system. In the method and design system according to the present invention first a representation of said application is loaded. Said representation comprises at least data access instructions on arrays. FIG. 2 shows as an example a representation of a real-time motion estimation application. FIG. 3 shows data organizations for said application.

In the method and design system in accordance with the present invention said arrays are partitioned in a plurality (one or more) of subarrays. Said subarrays are distributed over said first memory such that an optimal cache performance of said second memory is obtained. Said distribution defines said optimized data organization. With optimal cache performance is meant that the least number of conflict misses is obtained while executing said application on said digital system. Each of said subarrays are being located in said first memory at locations with subsequent addresses.

Figure 4:
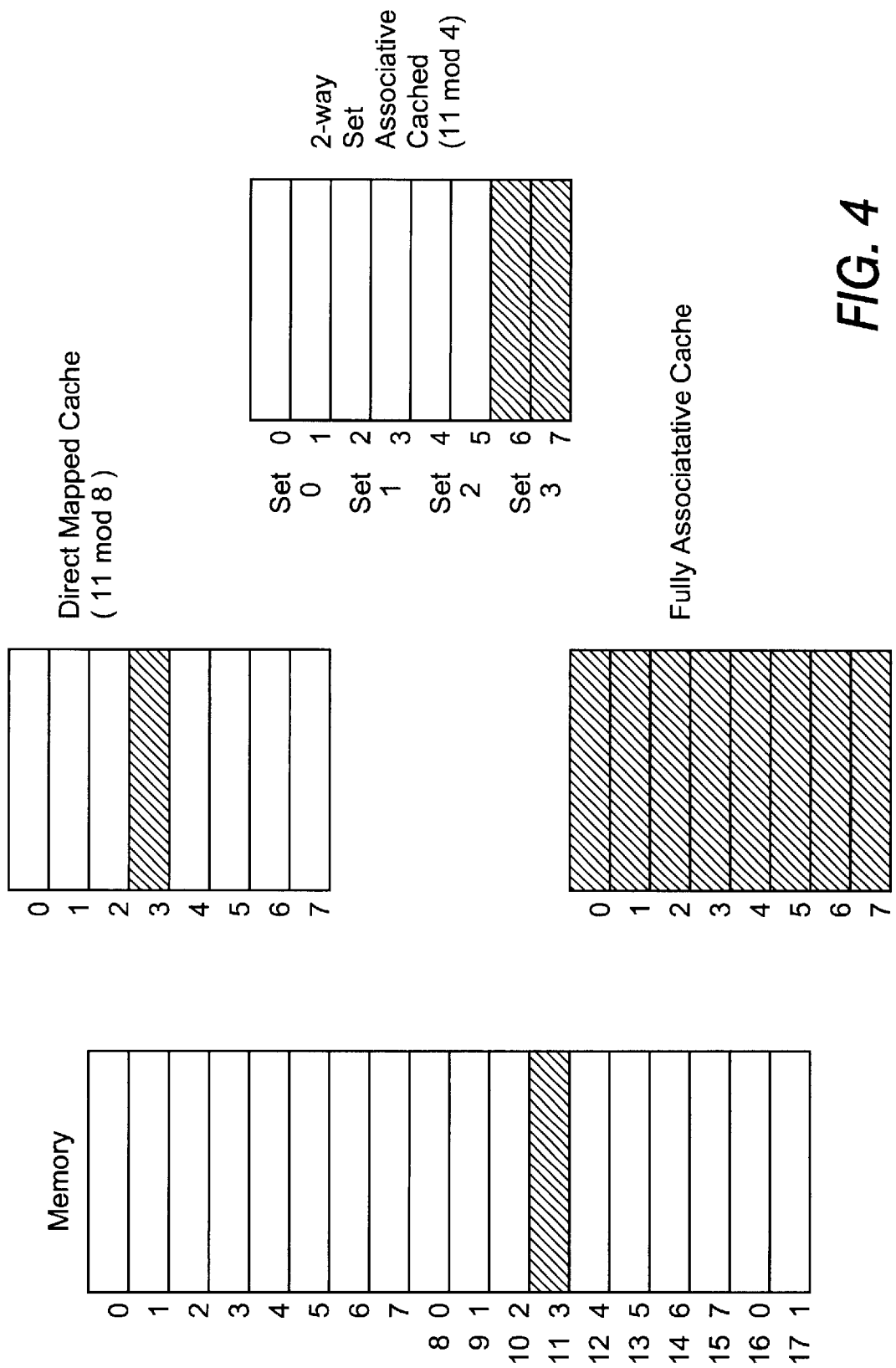
FIG. 4 shows the characterization of said second memory or cache by the amount of lines (here 8) and the size of said lines. Said lines are being grouped in sets. Said grouping is characterized by the amount of lines per set, and defines the associativitiy of said cache memory. In a direct mapped cache the number of lines in a set is one. In n-way set associative cache the number of lines (n) in a set is greater than one and less than the total number of cache lines. In a fully associative cache the number of lines (n) in a set is equal to the number of cache lines in a cache.

Said second memory or cache is characterized by the amount of lines and the size of said lines. Said lines are grouped in sets. Said grouping is characterized by the amount of lines per set, and defines the associativitiy of said cache memory. The product of said amount of lines and the size of said lines defines the cache size. Fundamentally, a cache consists of lines of data as illustrated in FIG. 4. Thus a cache of size 1 Kbyte with a line size of 128 bytes contains 8 lines. If these individual cache lines are grouped then sets of data are created. Thus, for the example above if 2 cache lines are grouped in one set then 4 sets of data are obtained. Similarly, grouping 4 cache lines in one set will result in 2 sets of data (for the given cache size i.e. 1 Kbyte).

Typically the data is mapped from the first memory to the second memory or cache using the principle that the address of said data in the cache is the address of said data in the first memory modulo the number of sets in said cache. Based on the above three concepts of lines, sets and mapping the three commonly distinguished types of caches are defined. In a direct mapped cache the number of lines in a set is one. Then each element from main memory can be mapped only to one particular cache line only. A cache with above feature is termed as direct mapped cache. In n-way set associative cache the number of lines (n) in a set is greater than one and less than the total number of cache lines. Then this cache is called as a n-way set associative cache. In a fully associative cache the number of lines (n) in a set is equal to the number of cache lines in a cache. In this type of cache any element from the main memory can be transferred to any location of the cache (assuming the cache location is free).

It will be recalled that the main aim of the data organization methodology in accordance with the present invention is to reduce capacity and conflict misses by organizing the data taking in to account the cache parameters and program characteristics. The main source of stalls in cache are the cache misses. There are three types of misses viz. Compulsory, Capacity and Conflict misses. Compulsory misses are inherent and cannot be fully eliminated, although techniques like prefetching are employed to reduce these misses. The capacity misses are caused by the limitation in size of the cache (also due to limited set associativity if a replacement policy is taken into account). For capacity misses there is no clear solution in the literature at the moment. The conflict misses are caused due to the limited associativity of the caches. In the present invention it is recognized that the root cause of conflict misses is the data organization in the main memory. So, if cache parameters viz. line size and set associativity are taken into account for the purpose of organizing data in main memory then elimination of conflict misses is possible to a much larger extent than with known techniques.

The following definitions are exploited throughout the description. The total number of cache misses minus the compulsory misses for a fully associative cache is termed capacity misses. This indeed means that only misses occurring due to non-availability of free space fall in this category. Often the term re-use capacity misses is used. This term refers this phenomenon to the lack of (temporal+ spatial) locality but this is very ambiguous and does completely comply with the definition. These misses are not due to a sub-optimal layout of data in the memory. The misses occurring due to the associative behavior of caches are termed as conflict misses. They are further classified as follows: When two values of the same array or signal get mapped to the same cache line (or more broadly the same set, as indeed the replacement policy has to be taken into account here.) there is a self-conflict cache miss. When two different arrays or signal get mapped to the same cache line (or the same set) there is a cross-conflict cache miss. Thus, it will be observed that both types of conflict misses occur due to sub-optimal layout of data in the memory.

A formal definition of the problem solved by the invented method can now be formulated as: Given the cache parameters (cache size (C), cache line size (L) and associativity (A)), program or application characteristics and the main memory size, obtain a data organization in main memory, such that the (initial) set of variables (arrays) mapped at a list of base addresses are re-organized into an equivalent set of variables (arrays and/or subarrays, being part of said initial arrays) with corresponding base addresses at so that the cost function (approximate miss count) is minimized.

In the method and design system in accordance with the present invention at least one of said arrays found in the representation of said application is partitioned in at least two subarrays. The method relies on optimally partitioning and then effectively distributing said partitions or subarrays.

In an embodiment of the invention a condition on said subarray distribution is presented. As the transfer of data from said first to said second memory is typically determined by a modulo operation on the base addresses of said data in the first memory, an optimal cache performance can be obtained by organizing said subarrays in said first memory such that each of the subarrays within an address range being equal to the cache size originate from different arrays.

In a memory allocation found by a traditional linker/compiler a first set of locations with subsequent base addresses are occupied by a first array, a second set of location for the second array and so on.

In the optimized data organization the arrays are broken up depending on the criteria, discussed further, and these small parts of the arrays are allocated in said first memory. This allocation of various parts of large arrays, being said subarrays, is such that all arrays are covered. And within a sequence of locations in said first memory, said sequence having the length of the cache size, said subarrays originate from different arrays.

An advantage of the present invention is that now the data is organized depending on their access structures and taking in to account the way data from main memory (or the next higher level) gets mapped to a cache. The only small drawback of this method and design system is that in the process some memory locations are lost due to breaking up of various arrays.

As typically an other data organization than the initial data organization, defined by said representation, is obtained, it can be said that the method modifies said representation, and more in particular the storage order of said arrays in said representation is changed. This should not be confused with modifying the execution order of the data access instructions. Indeed the method for determining said data organization relies on a fixed data-flow of the application representation.

In some embodiments of the invention methods for determining the size of each subarray, also denoted Tile Factor TF, are proposed. Said size of each subarray can be proportional with the size of the related array. The proportionality factor is defined by said cache size divided by the sum of the sizes of said arrays. Again as the transfer of data from said first to said second memory is typically determined by a modulo operation on the base addresses of said data in the first memory, the cache performance is optimized by choosing the size of each of said subarrays being a multiple of said line sizes. The proportionality condition and the multiplicity condition can be merged by stating that the size of each of said subarrays is the nearest rounded number of the size of the related array multiplied with the cache size divided by the sum of the sizes of said arrays. Said rounded number is a multiple of said line sizes. The proportionality and multiplicity merging results in a possible initial set of sizes of said subarrays. However further optimization of said sizes can be obtained by determining said sizes via optimization of an evaluation criterion, which may be related to the conflict misses. Said initial set of sizes can be used as an initialization of said optimization step. Said evaluation criterion preferably comprises at least of the cache miss count of said arrays.

The cache miss count or an approximation of the cache miss count can be used as the cost, evaluation or optimization function. Assume that said application representation comprises of different loop nests. A possible way to approximate the cache miss count for an array is given by the following formula:

$$AMC_k = \sum_{\forall j} \sum_{\forall i} \left( \frac{se_i}{C} \times TF_k \right); \quad i \neq k$$

The first sum is taken over all possible loop nests in the program or application representation with the variable under consideration k in it. The second sum is taken over all other elements (arrays) excluding the array under consideration k, which are alive in the j loop nests (where also the array under consideration k is alive). The size $se_i$ is the size of the arrays. $TF_k$ is the tile factor of the variable or array k, being the size of its subarrays. Note that the size sei can replaced by the effective size of the array i, defined as the actual size (or part) of the whole variable that is accessed in the particular loop nest. Other cost functions based on incorporating a data re-use factor can also be considered.

In a further embodiment of the invention a selection on the arrays, found in the application representation, is done. Only for the selected arrays the proposed partitioning and distributing is performed. The remaining arrays and potentially other variables are then pasted in potentially free locations in said first memory. A potential selection is based on the ratio of the size of said array over the cache size.

In an embodiment of the invention a post-processing step is applied on the application representation. Indeed as the method results in a change or modification of the storage order of the arrays, the addressing can become more complicated. Therefore the use of an address optimization step on said representation can be fruitful.

In a further embodiment of the invention a pre-processing step is applied on the application representation. Indeed various representation transformations such as loop transformations and loop blocking can also enhanced the cache performance. When a loop blocking approach is done successfully this does mean that for every iteration of a loop all the needed elements of the arrays do fit in the cache. As said pre-processing steps are orthogonal to the methodology according to the present invention they can be combined easily. Also other loop and control flow transformations have been fixed. The method and design system in accordance with the present invention for determining a data organization relies on the fact that the data-flow of the program is completely fixed and cannot be changed anymore (e.g. data-flow and data reuse transformations have already been applied before the partitioning and distributing of said subarrays.)

In a further embodiment of the invention it is recognized that in said application representation said data access instruction are grouped in blocks. For instance each loop nest defines a block of said instructions. As data access on arrays in one loop nest results in accessing arrays with overlapping life times, it can be useful to consider only part of said array instead of the actual size of an array, more in particular that part being accessed while executing said loop. Therefore, the concept of an effective size is defined for arrays. An effective size of an array is the size of that part of the array being accessed in the particular loop nest or block under consideration. It can be said that said effective size is related to said blocks. When a plurality of blocks are found in said application representation, a plurality of effective sizes are found for an array being accessed in said plurality of blocks. As the method requires the size of an array, one can use instead of the actual size of said array, a size determined from its effective sizes. Such a determination step can be for instance taking the maximal effective size as the size of the array. This size is then used for determining the size of each subarray via the proportionality principle, saying that said subarrays are proportional with the size of the related array. Also the multiplicity principle is exploited here.

More formally the number of elements of an array or signal accessed in a loop (nest) is termed as the Effective Size (ESize) of the particular array. Note that only a partial or the whole array can be accessed inside a loop. The difference in abstract time ($N_{reuse}$) between two different accesses to the same element(s) of an array is termed as Self-Reuse of the particular array. For elements on same memory line, thus we now take into account both temporal and spatial reuse. The self-reuse allows us to determine how long a particular array needs to be the in the cache. This can be used as a constraint in the invented memory allocation policy. The number of consecutive memory locations allocated to an array in the memory after the Proportionate Allocation step is termed as Tile Factor (TF) of the particular array. Obtaining a good tile factor is a crucial step in the invented methodology. Note that proportionate allocation allocates chunks of continuous memory locations to different arrays based on their effective size (and potentially also taking into account reuse factors) and the cache size/line size/associativity.

Note that for any array with N elements and a self-reuse of $N_{reuse}$, there exists a memory layout for the array to remove all cache misses related to self-reuse if $N_{reuse}$ less than or equal to C. Note that for i different arrays with sizes $N_i$ and corresponding reuses $N_{reuse}$, there exists a memory layout for all the arrays together to remove all the cache misses related to reuse if the sum over all arrays of the reuses $N_{reuse}$ is less than or equal to C.

Figure 5:
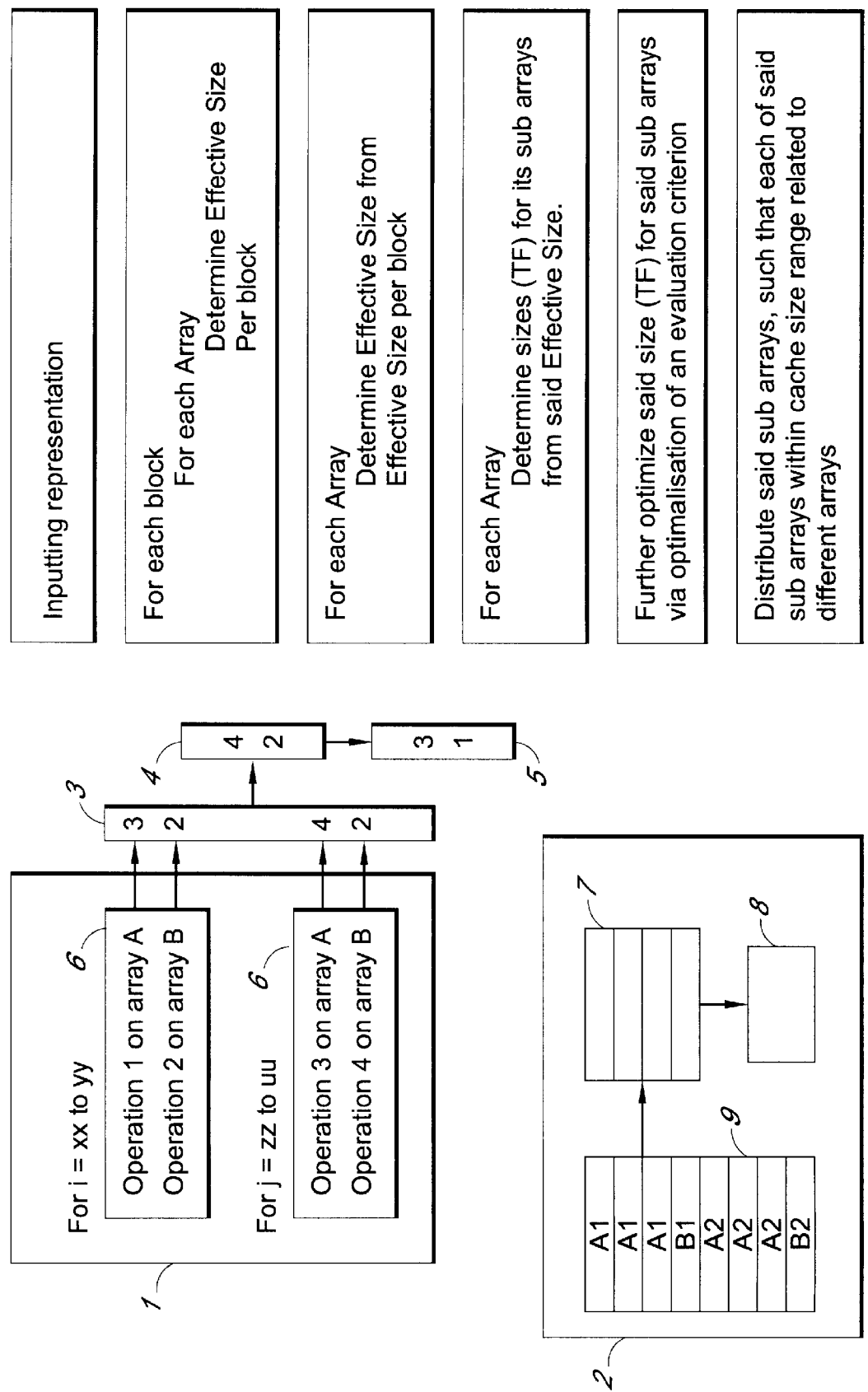
FIG. 5 shows a possible representation (1) of an application to be executed on an essentially digital system (2), comprising at least of a first memory (9), a second memory (7), operating as cache for said first memory, and a processor (8). The arrays, shown in said representation (1), are split in subarrays, which are distributed over said first memory (9), in order to optimize cache performance, more in particular cache misses minimization.

FIG. 5 shows a possible representation (1) of an application to be executed on an essentially digital system (2), comprising at least of a first memory (9), a second memory (7), operating as cache for said first memory, and a processor (8). In said representation blocks (6) of code are recognized, here each block being related to a particular loop nest. Said operations 1, 2, 3 and 4 on the arrays A and B involved in the application, can be read/write instructions or data access instructions in general. The right part of FIG. 5 shows a potential flow, for implementing the method according to the present invention. It shows that first for said arrays in said representation an effective size (3) is determined for each block. From said effective sizes an overall effective size (4) is determined for instance by taking the maximal value. Next the size (5) of the subarrays is determined by using the proportionality and rounding principle. Note that the cache size is here 4. Potentially, a further optimization step is exploited. Finally said arrays are split in subarray with said size or tile factor and distributed over said first memory (9), such that within an address range equal to the cache size, for each array a related subarray is found.

The method steps described above with respect to the present invention may be implemented on a suitable computer such as a workstation. The workstation may be adapted to carry out any and every method step in accordance with the present invention by provision of the appropriate software. The present invention includes a design system for determining an optimized data organization in at least one first memory of an essentially digital system comprising of at least said first memory and a second memory acting as cache for said first memory, said optimized data organization being characteristic for an application to be executed by said digital system, said design system comprising:

a memory store for storing a structure representing said application, said structure comprising at least data access instructions on arrays as well as for storing representations of said first and second memory;

a first computer device for partitioning said arrays in a plurality of subarrays;

a second computer device for distributing said subarrays over said first memory such that an optimal cache performance of said second memory is obtained; and a third computer device for outputting said distribution of said subarrays as said optimized data organization.

The first to third computer devices may be implemented as a single computer, e.g. a work station.

A further embodiment of the present invention will now be described with reference to FIGS. 6 to 11. Loop transformations, being transformations of representations of applications, to be executed on an essentially digital device, have been shown to be useful for power and speed optimization in the context of data storage and transfer dominated applications, run on custom and programmable processors. Said transformations can be applied before cache performance optimization is used. Also for parallel target architectures such transformations can be fruitful. Application of such transformations on parallel architectures are a further embodiment of the invention.

Under consideration is the mapping of an applications, being represented by some code on a parallel architecture. After pruning of the application, pruning being some simplification, mainly based on neglecting small or not often accessed variables, code transformations are considered. The goal of these transformations is to improve the data locality and regularity of the algorithm, for a parallel programmable target architecture. During this step, estimations for some of the following mapping steps are used (e.g. data reuse, memory (hierarchy) assignment, processor partitioning) although these further mapping steps are not executed yet.

Loop transformations are at the heart of the DTSE methodology. As the first step (after pruning) in the script, they are able to significantly reduce the required amount of storage and transfers. As such however, they only increase the locality and regularity of the code. This enables later steps in the script (notably the data reuse, memory (hierarchy) assignment and in-place mapping steps) to arrive at the desired reduction of storage and transfers.

The target architecture of this embodiment is parallel and programmable systems. This means that the memory hierarchy is (at least partly) known from the beginning, and thus that it can be taken into account from the first steps of the DTSE script.

In order to take this into account, different possibilities for data reuse and memory hierarchy assignment will already be taken into account during the transformation step. However, they will only be estimated: the goal is to improve the data locality and regularity of the code w.r.t. the target architecture. The output of the step is primarily the transformed algorithm. Of course, the estimations which were found can also be passed to the next steps, but they are certainly not fixed yet.

The same is true for the parallelization. Estimations for a good (i.e. which leads to a good data locality and regularity) processor partitioning will be made during the transformations, but the partitioning is not fixed yet; this is done by the parallelizing compiler which will have the transformed code as input. However, since a parallelizing compiler also works by transforming the code, it will in this case be necessary to pass some constraints to the compiler, such that it does not undo the DTSE optimizations.

Figure 6:
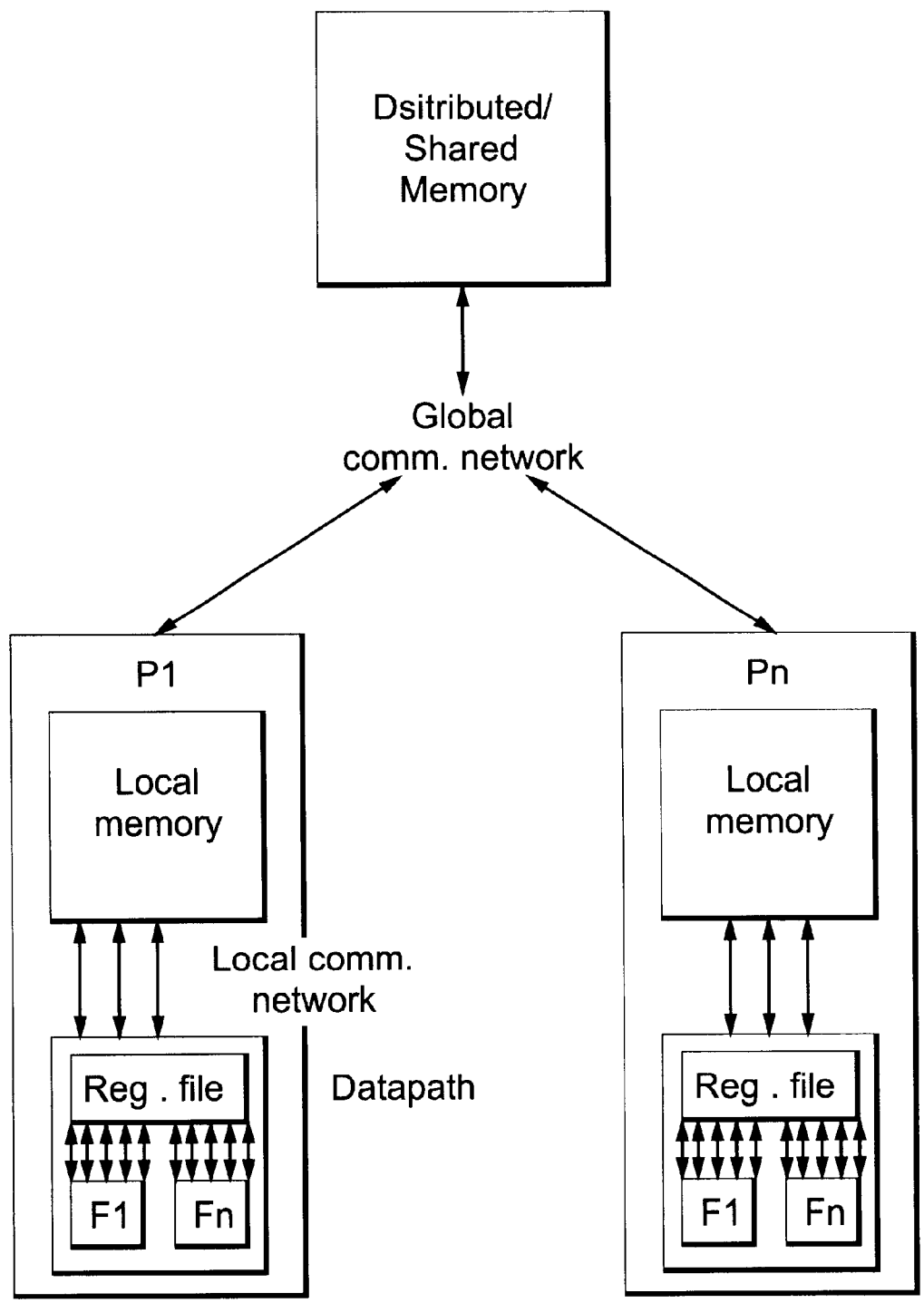
FIG. 6 is a schematic representation of a target architecture for use with another embodiment of the present invention.

The target architecture in FIG. 6 is parallel, programmable and heterogeneous. It consists of a number of processors, each of which has a data-path with some functional units and a number of registers. It is assumed that there is no restriction on the communication between the functional units and the registers (this is always the case in today's processors). Each processor can also have a local memory hierarchy (consisting of (software controllable) SRAM's and (hardware controlled) caches). Furthermore, there is a global distributed shared memory.

The important parameters at this level of the script are the size of each of the memories, and the bandwidth between the levels of the hierarchy. The latency should not be taken into account at this level.

Given a program in the form of a set of Conditional Recurrence Equations (CRE's), meaning that a full data-flow analysis has already been done, and given a target architecture (especially the memory hierarchy), find (I) a transformed program, which has been optimized for locality and regularity, considering the target architecture and (ii) an estimation of the processor partitioning (preferably in the form of constraints).

In the PDG-model, the following has to be found (this will be clarified later on): (I) Processor mapping, (II) Placement of iterations in common node space (per processor), (III) Ordering vector for each processor, (IV) Global ordering and (IV) Mapping of signals which are alive on said memory hierarchy. Note that no particular order for finding these is imposed yet.

The processor mapping maps each operation of each CRE to a processor. For each CRE k, a function Pk(x) has to be found, which defines the partitioning of the algorithm over the processors.

Figure 7:
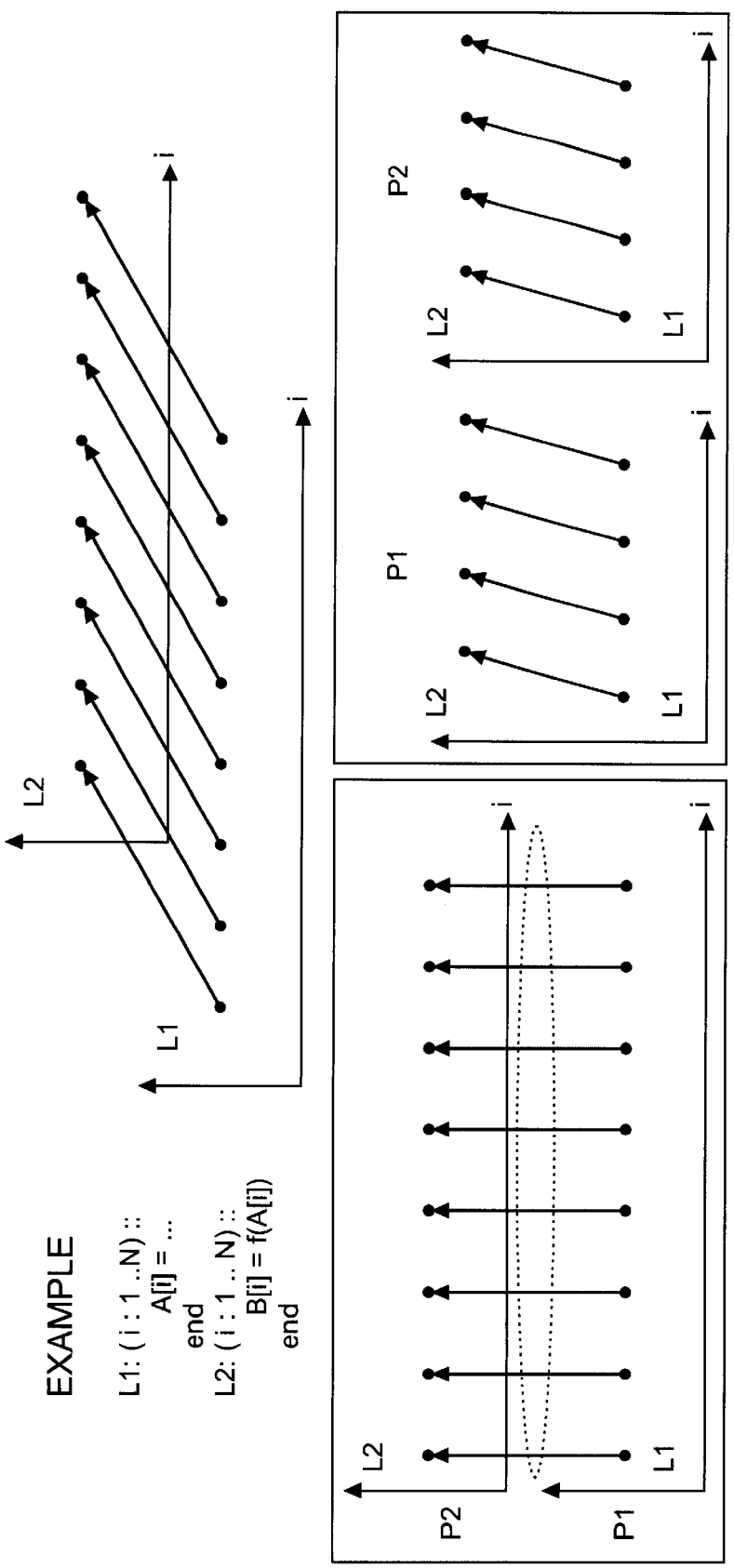
FIG. 7 is an example of processor mapping.

FIG. 7 illustrates the processor mapping. The program consists of two loops: the first computes an array A[ ] and the second computes an array B[ ] out of A[ ]. The iteration spaces of the loops are presented geometrically, and the dependencies between the operations are drawn. Two processor mappings are shown. At the left, the first loop is mapped to processor 1 (P1) and the second loop to processor 2(P2). This results in a significant interprocessor communication: indeed all dependencies go from P1 to P2 now. At the right, half of each loop is mapped to P1, and the other half of each loop to P2. In this way, all dependencies are now inside the processors, and there is no interprocessor communication anymore.

In placement and ordering steps, the loop transformations are performed. This is done in two steps: first all polytopes are mapped into a common node space (placement), and then an ordering for all the operations is defined by choosing an ordering vector in the common node space. Local loop transformations are done by transforming individual polytopes, and global transformations by choosing a relative placement of the different polytopes. The ordering vector Pi which is defined must be legal: it must respect the dependencies. This means that if there is a dependency of x to y, then Pi(xy) should be positive.

Figure 8:
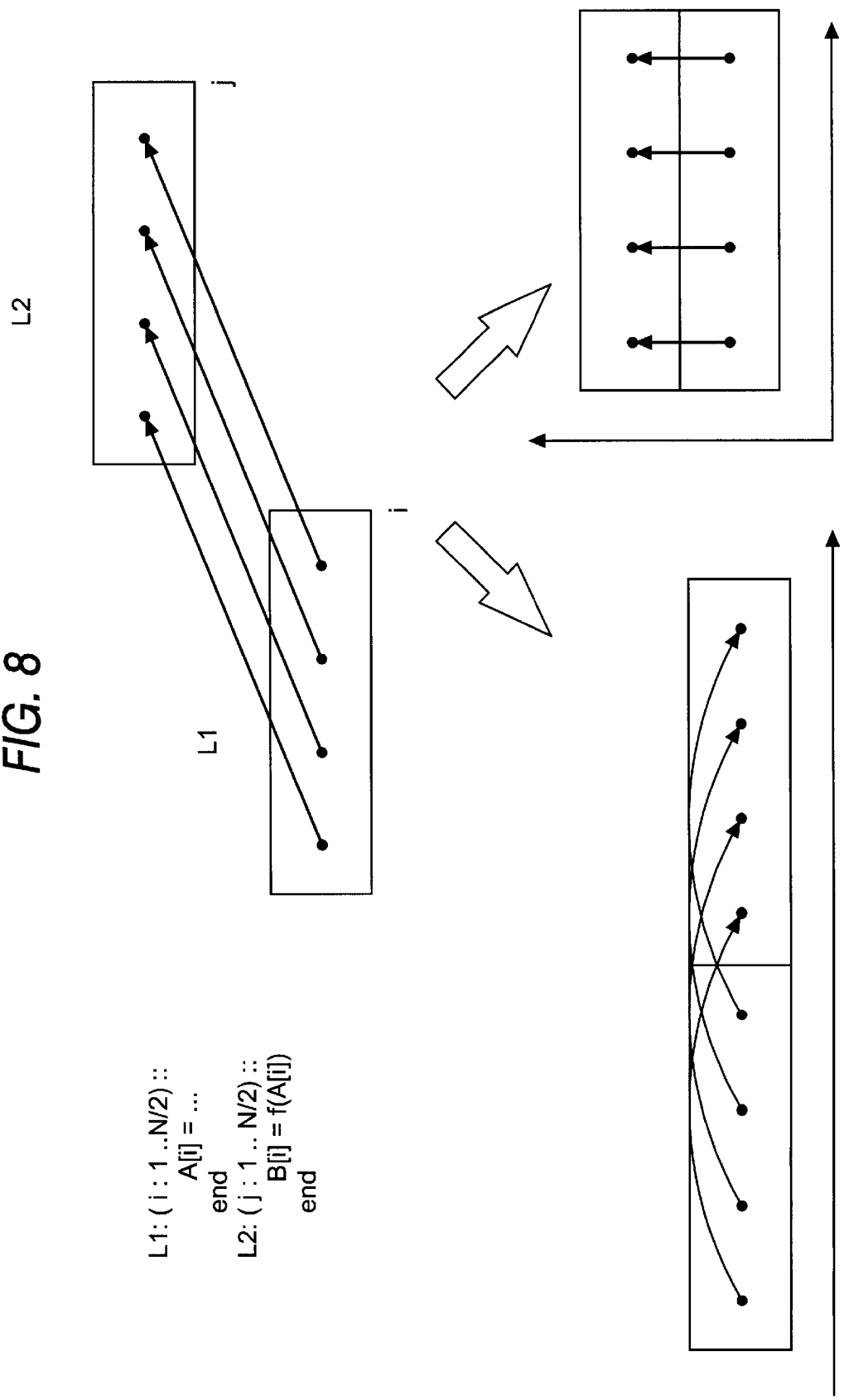
FIG. 8 is an example of loop merging: placement.

In FIG. 8 on loop merging, two loops are shown again, together with there iteration spaces. Two (out of many) possibilities to map these polytopes into a common node space are shown: at the left, they are mapped linearly after each other, and at the right, they are mapped above each other. Note that for this last mapping, the dimension of the common node space needs to be higher than the dimension of the individual polytopes. It is clear that in the first solution, the dependency vectors are very long, while they are very short in the second solution.

If an ordering vector has to be defined for the first solution, there is only one possibility: traversing the space from left to right. At most N dependencies will be crossed at the same time, which means that a memory of N locations is required to execute the algorithm.

Figure 9:
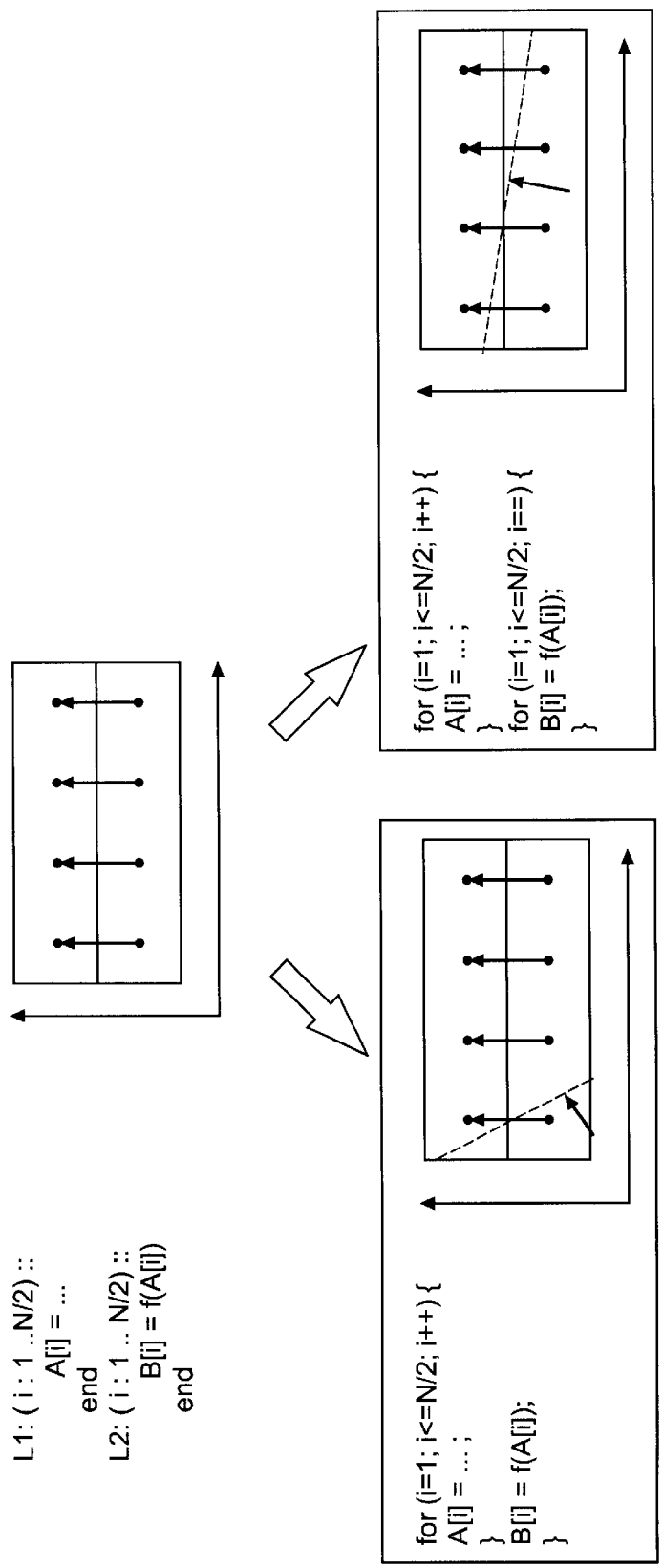
FIG. 9 is an example of loop merging: ordering.

For the second solution, there are several possibilities to traverse the iteration space: see FIG. 9 (which shows the ordering vector along with the corresponding procedural version of the algorithm). The ordering vector at the left represents in fact a loop merging of the initial algorithm. Only one register is required in this case. The solution at the right represents the procedural interpretation of the initial algorithm: a memory of N locations is again required in this case.

Figure 10:
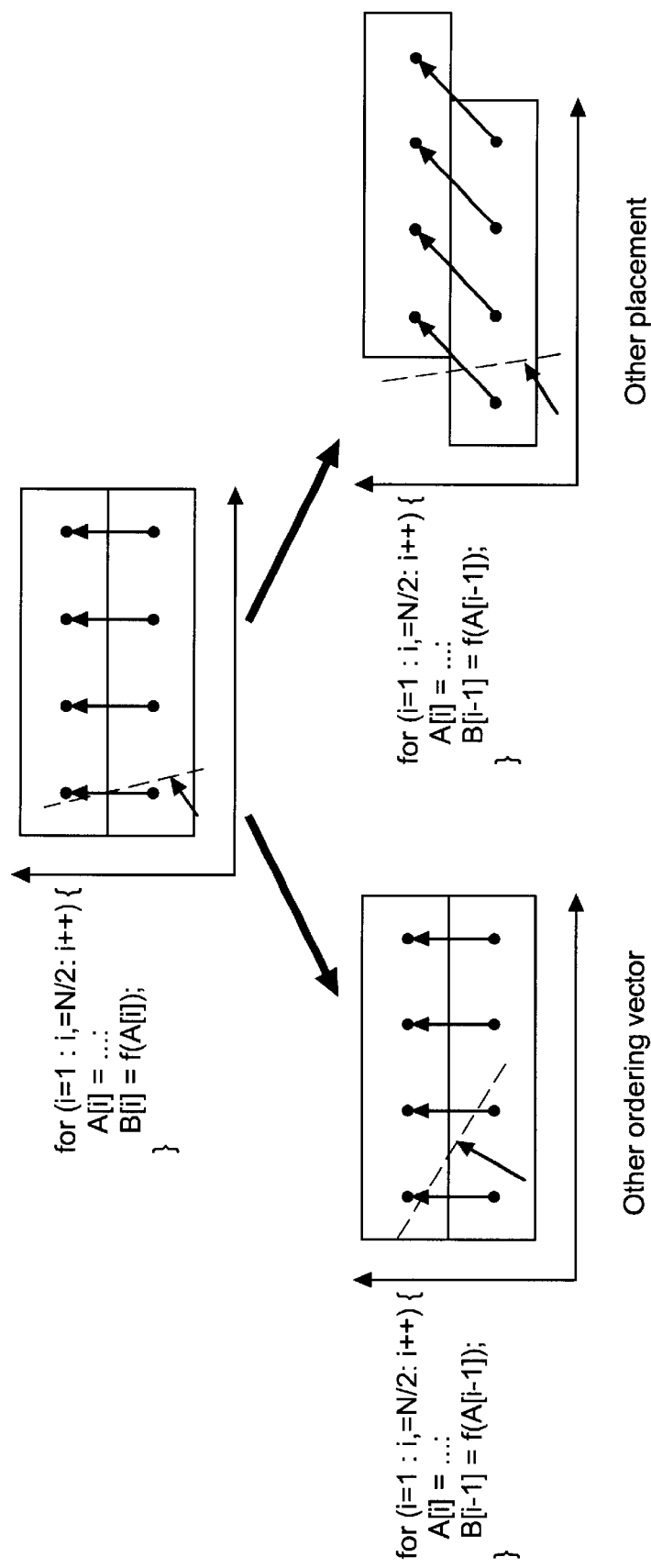
FIG. 10 is a representation of two ways to perform loop folding.

FIG. 10 on loop folding shows two ways in which a loop folding transformation can be performed: by choosing a different placement, or by choosing a different ordering vector.

Figure 11:
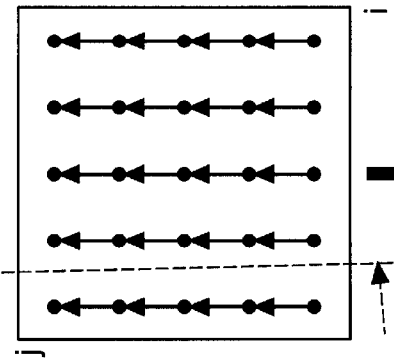
FIG. 11 is a representation of two ways to perform loop interchange.
Figure 11:
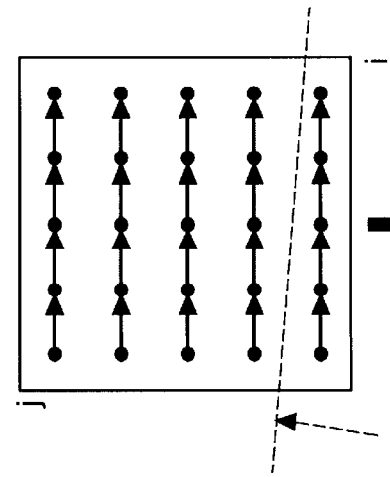
Figure 11:
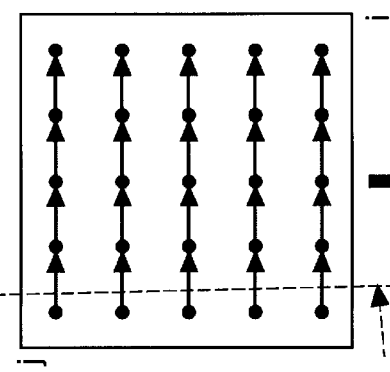

FIG. 11 on loop interchange illustrates loop interchange. Also here two (out of many) possibilities for performing this transformation in the PDG-model are presented, namely two combinations of placement and ordering.

Concerning global ordering, the ordering vectors only define the relative ordering of operations which are mapped to the same processor. So, there is also a global ordering function required which defines the relative ordering of operations that are mapped to different processors. This is not so obvious, since for heterogeneous target architecture, the relative speeds of the different processors have to be taken into account.

Concerning mapping of signals which are alive on the memory hierarchy, the most general problem is: at each moment of time, all signals which are alive have to be mapped to the memory hierarchy. This is of course much to complex, so simplification will absolutely be needed. It is already clear that signals in 1 processor can be mapped to the local memory hierarchy of that processor, while signals between different processors have to be mapped to the shared memory hierarchy.

Data reuse and memory hierarchy assignment is currently not modeled in the PDG-model. A proposal to model it is the following: (I) All operations in the common node space get an extra attribute: the memory level to which the output of the operation is written. (ii) Signal copies are modeled by additional "dummy" polytopes. They map a signal from one level of the memory hierarchy to another level. The function which they execute is the identity function. (III) During the exploration of the search space, these polytopes can be freely inserted and deleted.

Figure 12:
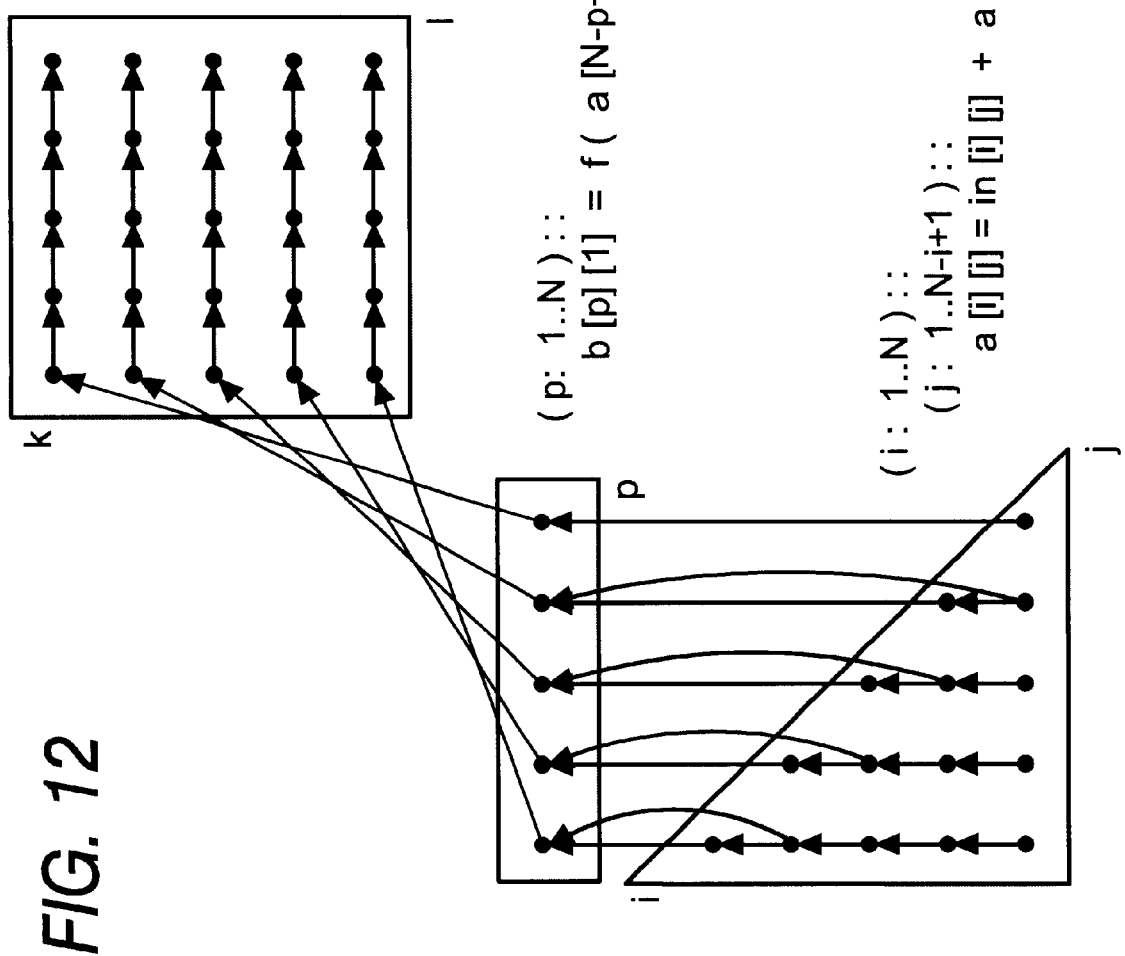
FIG. 12 shows a common node space.

In this following, a somewhat bigger example will be given in order to illustrate how also global transformations can be performed by the placement and ordering steps. The initial specification is the following:

A: (i: 1 ... N)::
   (j: 1 ... N−i+1)::
      a[i][j]=in[i][j ]+a[i−1][j];
B: (p: 1 ... N)::
   b[p][1]=f(a[N−p+1][p], a[N−p][p]);
C: (k: 1 ... N)::
   (l: 1 ... N)::
      b[k][l+1]=g(b[k][l]);

The FIG. 12 shows the common node space, as it could be when the polytopes corresponding to the loop nests are more or less placed arbitrarily (in the figures, N is assumed to be 5).

Figure 13:
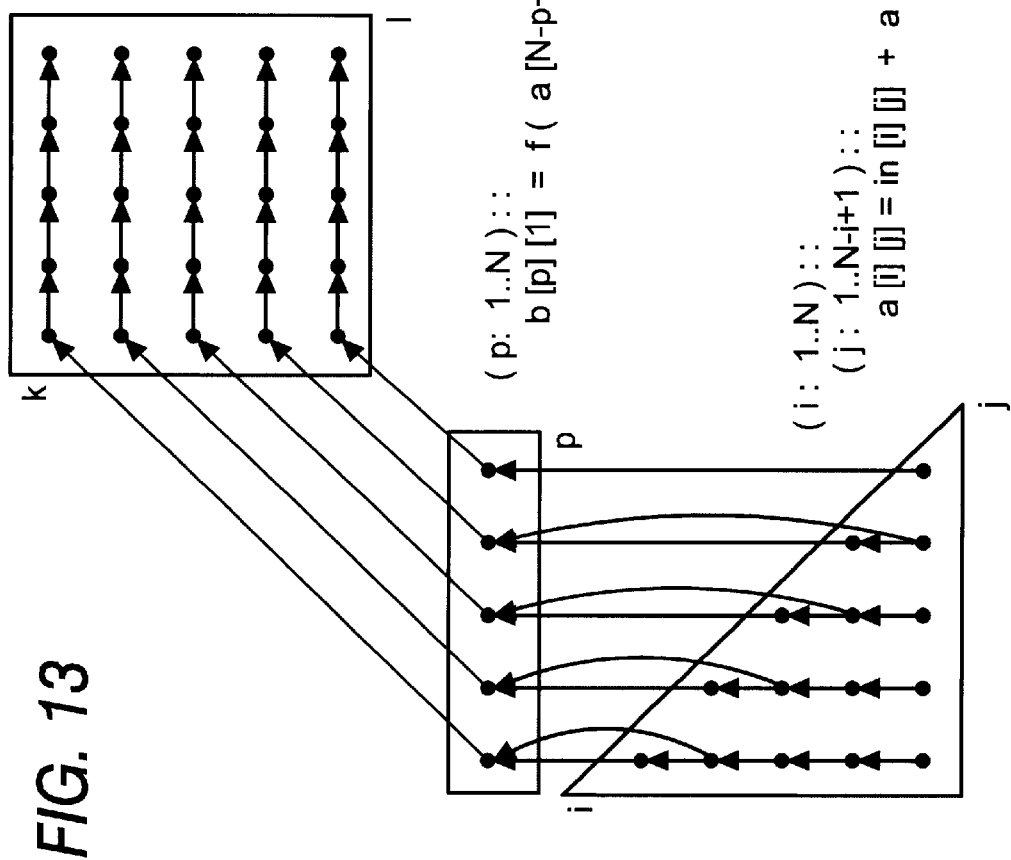
FIG. 13 showing mirroring a polytope around a horizontal axis.

In a first step, being placement, the dependency cross is removed by mirroring polytope C around a horizontal axis. In de code, the corresponding transformations would be a loop reversal. This is however not completely true because, as explained above, we have only a real transformation when placement as well as ordering have been chosen (FIG. 13).

Figure 14:
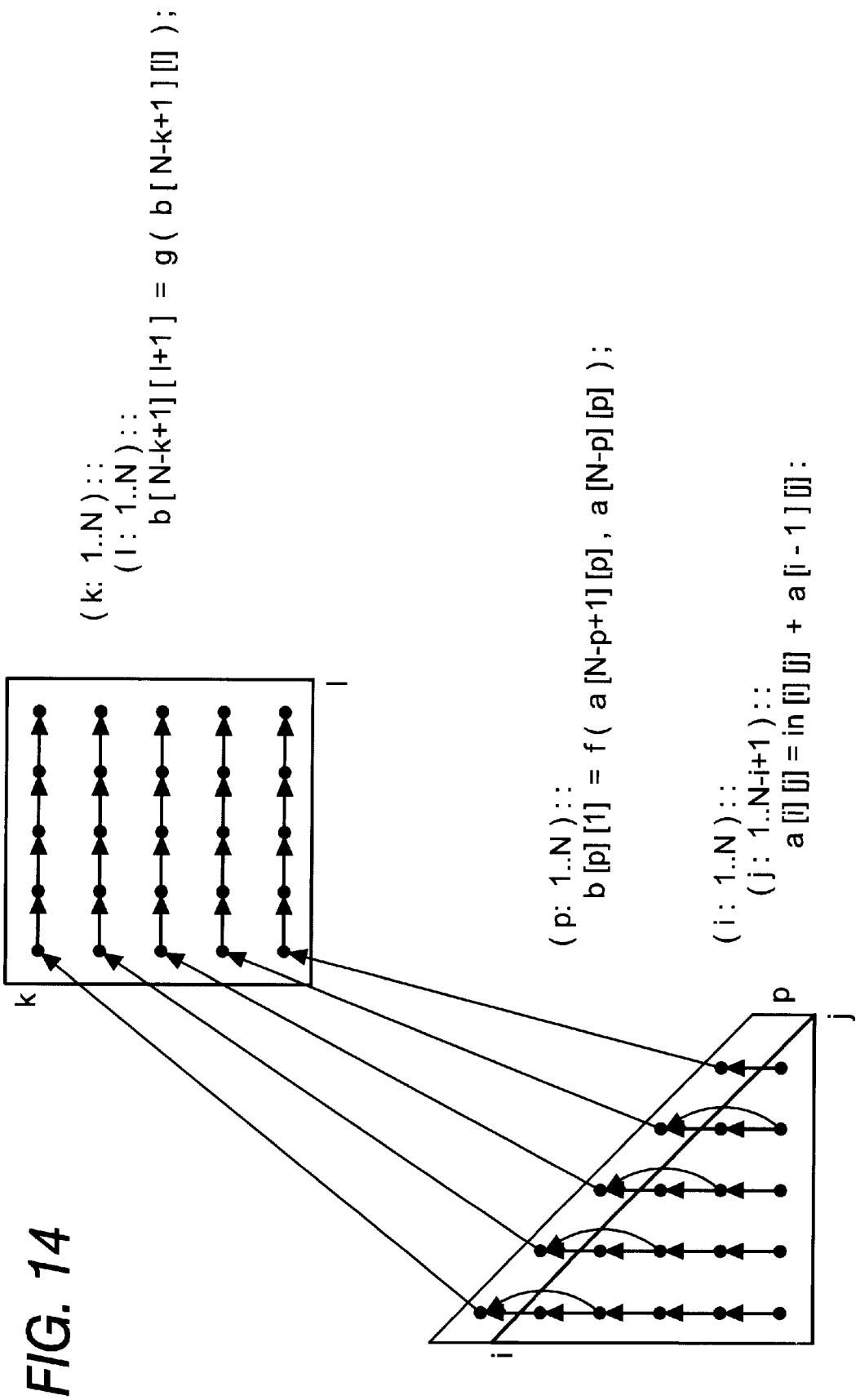
FIG. 14 is a representation of common node space mirroring about a horizontal axis and skewing downwards.

In a second step, polytope B is skewed downwards, such that it closely borders polytope A. In this way, the length of the dependencies between A and B is strongly reduced. The common node space now looks as in FIG. 14.

Figure 18:
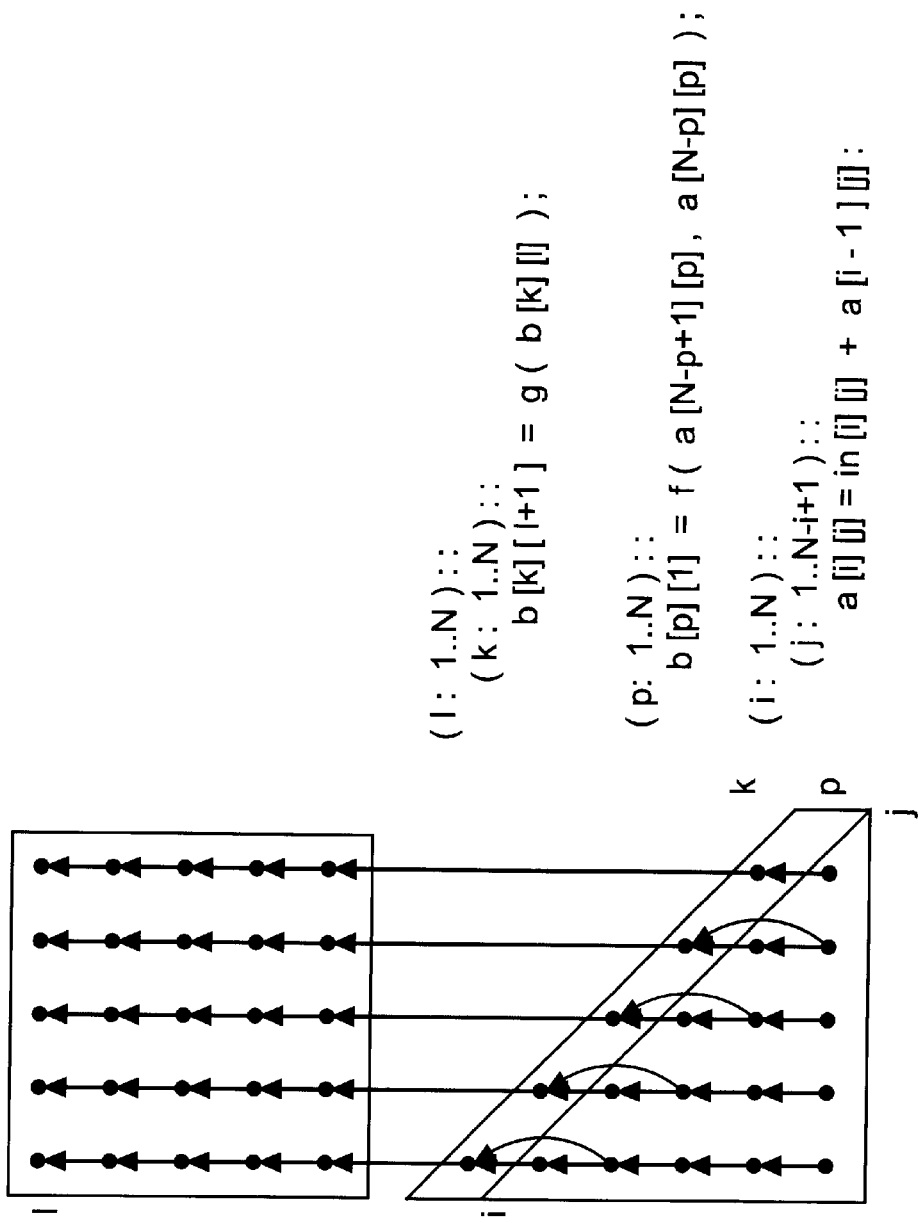
FIG. 18 shows rotation of a polytope corresponding to a loop interchange transformation in the code.

Now it is seen that all dependencies in A and B point upwards, while those in C point to the right. The dependencies between B and C have directions between these two extremes. However, by rotating polytope C 90 degrees counterclockwise, all dependency vectors can be made to point in the same direction (upwards). This rotation of polytope C corresponds more or less to a loop interchange transformation in the code (FIG. 18).

Figure 15:
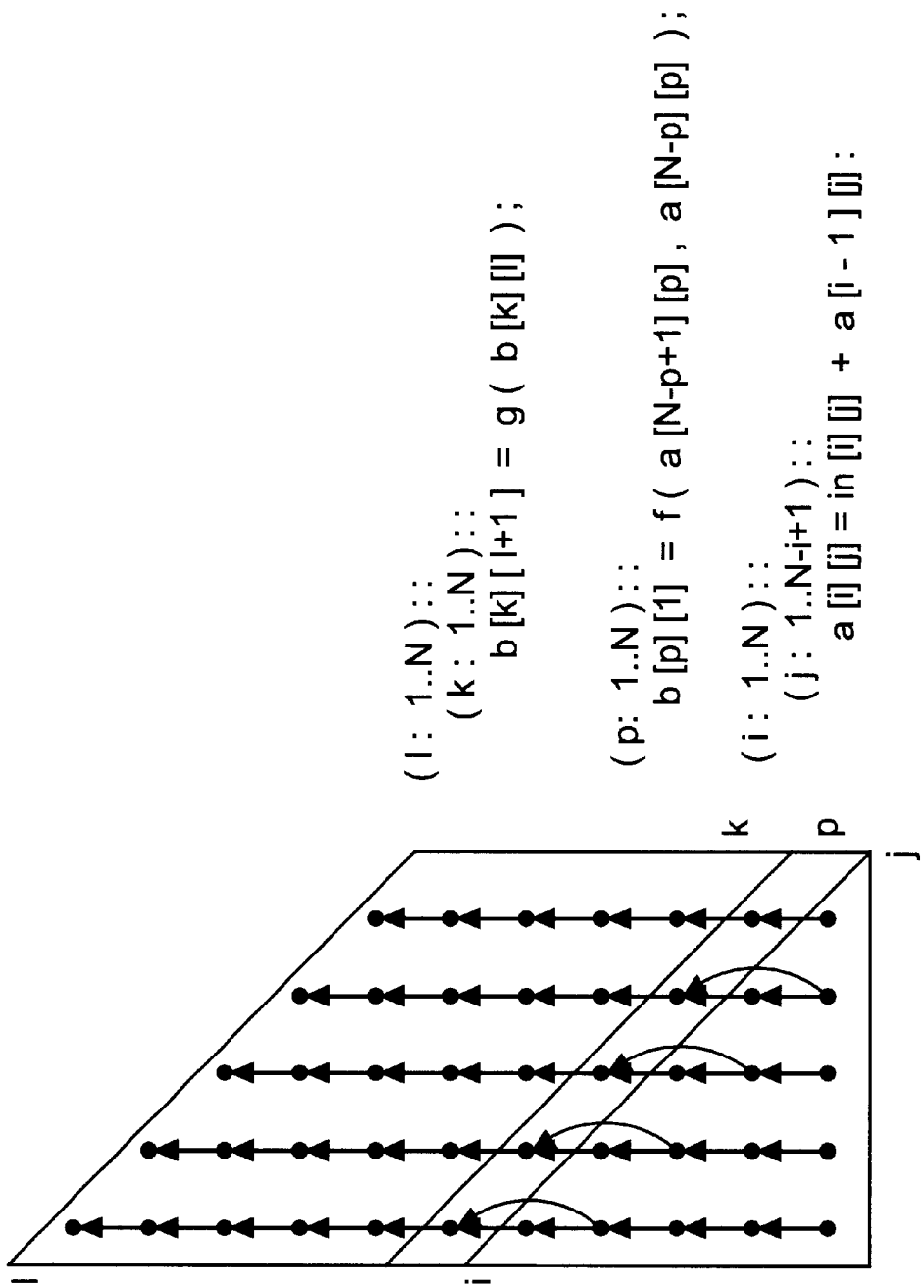
FIG. 15 shows final placement in the common node space.

Next polytope C is skewed downwards, such that it also closely borders polytopes A and B. In this way, the dependency vectors between B and C become much shorter. This corresponds (again more or less) to a loop skewing transformation in the corresponding code. The final placement in the common node space looks in FIG. 15.

Figure 16:
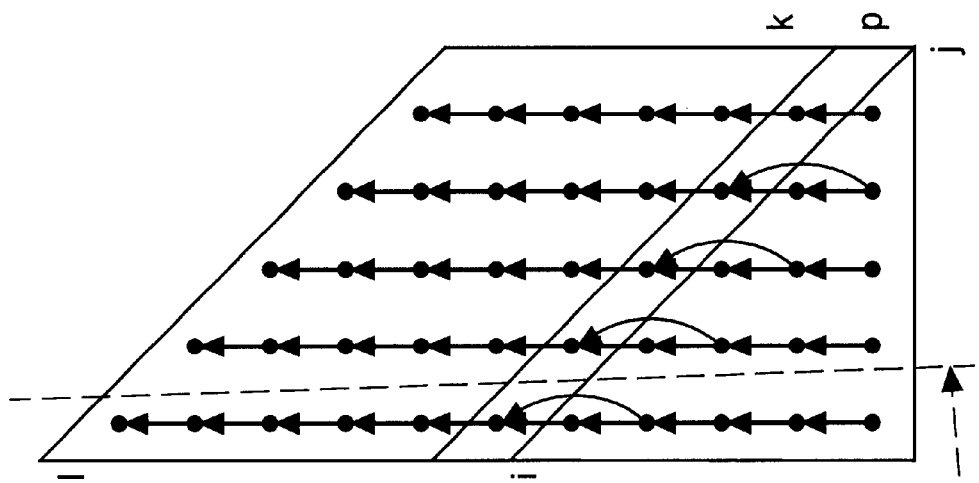
FIGS. 16 and 17 showing orderings.
Figure 17:
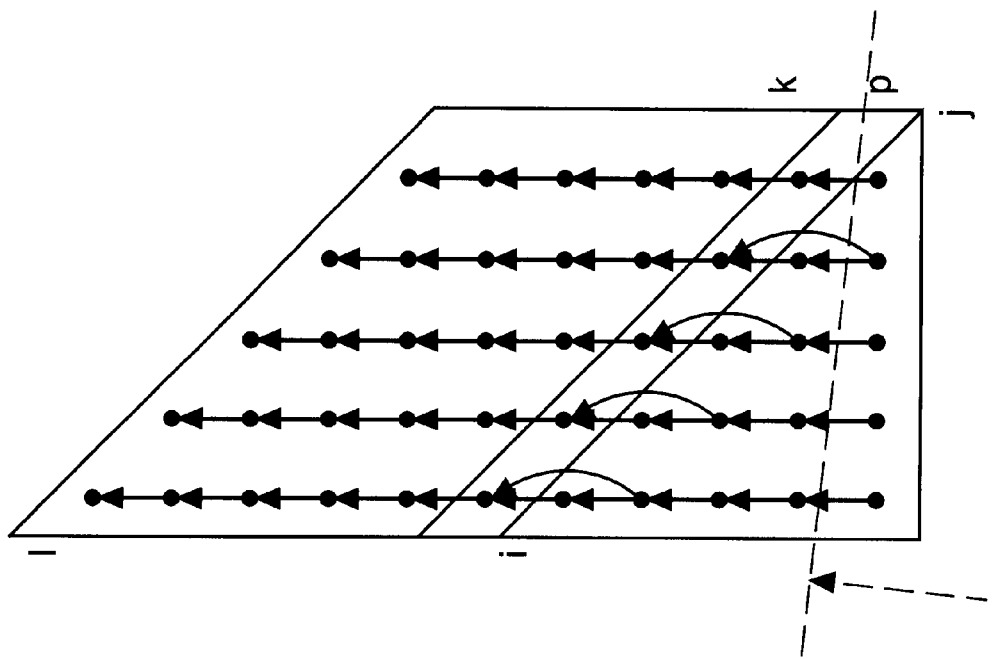

Concerning the ordering two of the many possible orderings for the final placement will be tried (FIGS. 16 and 17). In FIG. 17 the first ordering, as well as the procedural code which corresponds to it are shown. In the first ordering, the required buffer space is N+3. This is already much better than the initial specification which required 2N memory locations. However, another ordering vector leads to a solution that requires only 2 registers (FIG. 16).

It is clear that many heuristics will be needed to explore the search space in an efficient way. It is already very complex in the two dimensional case, and when more dimensions are present, it becomes also much more difficult to reason about it. Some heuristics will deal with the order in which different aspects have to be solved. The two next subsections present some ideas about this. Solving the processor mapping and placement at the same time is too complex. Therefore, two possibilities remain: (I) Doing first the processor mapping and then the placement. This would not be in line with the conclusions of several experiments in the past, which have shown that this leads to large buffers between the different processors. Indeed, the parallelization had too be done after the DTSE steps in order to arrive at a good solution. (II) First doing the placement in one global common node space, and then doing the processor mapping. This makes the generation of constraints for the parallelizing compiler easier (since it will be more clear which part of the processor mapping was actually necessary for the DTSE). On the other hand, incoming constraints on the processor mapping (e.g. in heterogeneous architectures) will be more difficult to handle.

The advantage of decoupling placement and ordering is that it makes the problem less complex. In each step, a cost function can be used which is more simple than a combined cost function. The disadvantages are: (I) All transformations can be performed in many different ways, by different combinations of placement and ordering. (II) Sometimes a placement can be chosen which does not allow a good ordering anymore.

Therefore, it is proposed to couple the placement and ordering steps a bit more, by also keeping an eye on the ordering while doing the placement. A possible method is to compute the ordering not only in the end, but also at a number of intermediate moments.

Mapping all polytopes at the same time is much too complex, therefore they will be mapped one by one, or in small groups. An additional step will precede the placement, and will try to find a good ordering for the polytopes to be placed. Some polytopes will also be combined in small groups, indicating that they should be mapped together. This could e.g. be done when the loop nests represented by these polytopes have already a very good DTSE behavior.

For Data reuse and memory (hierarchy) assignment, allowing extra "dummy" polytopes (which model signal copies) to be inserted at any moment makes the search space exploration again much too complex. Therefore, it is proposed to only try this when we do not arrive at a good solution for the placement of a certain polytope without doing this.

What is claimed is:

1. A method of determining an optimized data organization in at least one first memory of an essentially digital system comprising of at least said first memory and a second memory, the second memory acting as cache for said first memory, said optimized data organization being characteristic for an application to be executed by said digital system, said method comprising:

loading a representation of said application, said representation comprising at least data access instructions on arrays;

partitioning at least one of said arrays into a plurality of subarrays;

distributing said subarrays over said first memory such that an optimal cache performance of said second memory is obtained; and wherein said distribution of said subarrays defines said optimized data organization.

2. The method of claim 1, wherein optimal cache performance is determined by the least number of conflict misses which would occur on executing said application on said digital system.

3. The method of claim 1, wherein each of said subarrays is located in said first memory at locations with subsequent addresses.

4. The method of claim 3, wherein said second memory is characterized by the amount of lines and the size of said lines, said lines being grouped in sets, said grouping being characterized by the amount of lines per set, the product of said amount of lines and the size of said lines defining the cache size.

5. The method of claim 4, wherein said distribution of subarrays is such that subarrays within an address range being equal to the cache size originate from different arrays.

6. The method of claim 5, wherein the size of each subarray is proportional with the size of the related array.

7. The method of claim 6, wherein said proportionality is defined by said cache size divided by the sum of the sizes of said arrays.

8. The method of claim 6, wherein the size of each of said subarrays is a multiple of said line sizes.

9. The method of claim 5, wherein the size of each of said subarrays is the nearest rounded number of the size of the related array multiplied with the cache size divided by the sum of the sizes of said arrays, such that said rounded number is a multiple of said line sizes.

10. The method of claim 5, wherein the size of each of said subarrays is determined by optimizing an evaluation criterion which is related to conflict misses.

11. The method of claim 10, wherein said evaluation criterion comprises at least the cache miss count of an array.

12. The method of claim 1, wherein only arrays having a ratio of their size over the size of said second memory being larger than a predetermined threshold value are partitioned, said arrays being denoted selected arrays.

13. The method of claim 1, wherein said distribution of said subarrays results in modifying the storage order of said arrays in said representation.

14. The method of claim 1, additionally comprising applying an address optimization step on said representation.

15. The method of claim 1, wherein before said partitioning of arrays, loop transformation and loop blocking steps are applied on said representation.

16. The method of claim 1, wherein said data access instructions in said representation are grouped in blocks, and wherein said sizes of said arrays being determined from the effective sizes of said arrays, said effective sizes being related to said blocks.

17. The method of claim 1, wherein the partitioning is based at least in part upon the size of the second memory.

18. A design system for determining an optimized data organization in at least one first memory of an essentially digital system comprising of at least said first memory and a second memory acting as cache for said first memory, said optimized data organization being characteristic for an application, to be executed by said digital system, said design system comprising:

a memory store for capable of storing a structure representing said application, said structure comprising at least data access instructions on arrays as well as for storing representations of said first and second memory;

a first computing device for capable of partitioning at least one of said arrays into a plurality of subarrays;

a second computing device for capable of distributing said subarrays over said first memory such that an optimal cache performance of said second memory is obtained, and a third computing device for capable of outputting said distribution of said subarrays as said optimized data organization.

19. The design system of claim 18, wherein the first to third computing devices are implemented in a single computer.

20. The design system of claim 18, wherein optimal cache performance is determined by the least number of conflict misses which would occur on executing said application on said digital system, further comprising a fourth computing device for at least estimating the number of conflict misses which would occur on executing said application on said digital system.

21. The design system of claim 17, wherein the first computing device partitions the arrays based at least in part upon the size of the second memory.

* * * * *